United States Patent [19]

Stillbäck

[11] Patent Number: 4,687,172
[45] Date of Patent: Aug. 18, 1987

[54] COMBINED HANDLE AND LOCKING MECHANISM FOR A DASHBOARD MOUNTED APPARATUS SUCH AS A CAR RADIO

[75] Inventor: Ola Stillbäck, Hisings Backa, Sweden

[73] Assignee: AB Volvo, Goteborg, Sweden

[21] Appl. No.: 882,973

[22] PCT Filed: Nov. 5, 1985

[86] PCT No.: PCT/SE85/00434

§ 371 Date: Jun. 24, 1986

§ 102(e) Date: Jun. 24, 1986

[87] PCT Pub. No.: WO86/02891

PCT Pub. Date: May 22, 1986

[30] Foreign Application Priority Data

Nov. 6, 1984 [SE]  Sweden ................................ 8405559

[51] Int. Cl.[4] ............................................. F16M 13/00
[52] U.S. Cl. .................................... 248/551; 248/27.1; 248/201
[58] Field of Search ............ 248/551, 544, 201, 205.1, 248/27.1, 27.3; 292/227, 207

[56] References Cited

U.S. PATENT DOCUMENTS 3,352,586  11/1967  Hakason ............................... 292/227
4,103,983  8/1978  Morrison .............................. 248/201

FOREIGN PATENT DOCUMENTS 0142600  5/1985  European Pat. Off. .
2903176  7/1980  Fed. Rep. of Germany .
2915333  10/1980  Fed. Rep. of Germany .
2944862  5/1981  Fed. Rep. of Germany .

Primary Examiner—Reinaldo P. Machado
Assistant Examiner—Alvin Chin-Shue
Attorney, Agent, or Firm—Young & Thompson

[57] ABSTRACT

A combined handle and lock mechanism for a dashboard mounted apparatus, such as a car radio, comprises a slide displaceable in a guide on either side of the apparatus, the outer end of each slide being made as a handle and the inner end of each slide cooperating with a latch member to lock the apparatus in a cassestte. The slide has an inserted position, in which it is locked against being pushed out, at the same time the latch member is blocked in a locked position. When the slide is pushed in further the latch member and the slide are unlocked so that the slide handle is accessible for pulling out the apparatus.

8 Claims, 1 Drawing Figure

U.S. Patent     Aug. 18, 1987     4,687,172
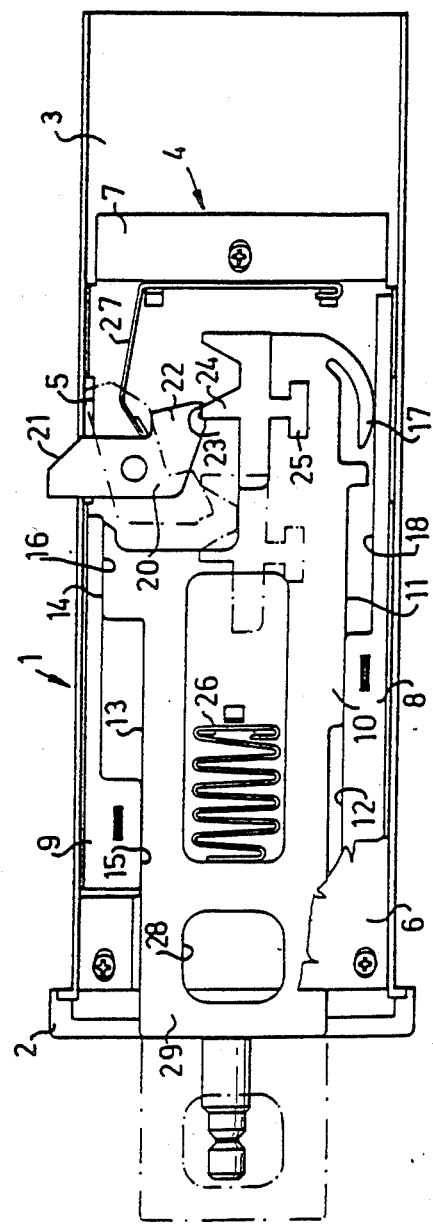

COMBINED HANDLE AND LOCKING MECHANISM FOR A DASHBOARD MOUNTED APPARATUS SUCH AS A CAR RADIO

The present invention relates to a combined handle and lock mechanism for a dashboard mounted apparatus such as a car radio or the like, comprising a latch member which can be moved into and out of engagement with a cooperating blocking means fixed relative to the dashboard.

With the increasing complexity and costliness of car radios, it has become common practice to mount the radio in a theft preventive cassette in the dashboard, so that the driver can take the radio with him when leaving the car. The requirements placed on such a cassette installation are firstly that the apparatus must be held securely in the cassette so that it does not vibrate and rattle, and secondly that the apparatus must, with a few simple manipulations, be able to be inserted and locked, as well as unlocked and removed, from the cassette.

In the cassette installation described in DE OS 2903176, the apparatus housing itself is provided on opposite sides with spring tongues and the cassette (the frame portion) mounted permanently in the dashboard is provided with recesses to fit the tongues, into which the tongues snap when the apparatus is inserted into the cassette. In order to remove the apparatus, the spring tongues must be moved out of the cassette recesses. This is done with the aid of a pair of separate U-shaped rods, which are inserted through openings in the front plate of the apparatus and thereby push the tongues out of the recesses at the same time as the rods hook on to the tongues, to then be used as handles to pull the apparatus out of the cassette. One of the disadvantages of this arrangement is however that one must always keep track of a pair of loose components, without which it is very difficult to remove the apparatus.

The purpose of the present invention is to achieve a mechanism of the type described above, without any loose or protruding parts, which is simple to handle and holds the apparatus securely and rattle-free in place in the dashboard.

This is achieved according to the invention by means of a mechanism, which has a slide guide to be securely fastened to the apparatus, a slide displacably mounted in the slide guide and having a handle shaped end portion, a latch member displacably mounted relative to the slide guide, and interacting portions of the slide and the latch member, said portions, in a predetermined inserted position of the slide, holding the latch member in a locked position and blocking the slide against being pushed out but permitting further insertion of the slide from said predetermined position to disengage the latch member and permit the slide to be pushed out past said predetermined position to the outer end position in which the handle protrudes outside the slide guide.

The invention will be described in more detail with reference to an example shown in the accompanying drawing, where the figure shows a side view of a car radio with partially cut away handle and locking mechanism according to the invention.

In the figure, 1 designates an apparatus case and 2 a front plate which in a conventional manner frames the front of the apparatus and forms a transition to the surrounding dashboard. A mechanism according to the invention (generally designated 4) is screwed to either side 3 of the apparatus case.

The mechanism 4 comprises a bottom plate 5 and a cover plate 6, which are screwed securely to each other. The bottom plate 5 has pressed raised portions 7, so that a space is formed between the plates. In the space, a pair of guides 8 and 9 of a low friction material, preferably a plastic material, are fixed and between them there is guided a slide 10. The slide 10, which is somewhat resilient and suitably consists of the same material as the guides 8 and 9, has a lower guide surface 11, which slides against a guide surface 12 on the lower guide 8, and upper guide surfaces 13, 14, which slide against guide surfaces 15, 16, respectively, on the upper guide 9. The slide 10 is guided with a slight clearance (not shown) between the guides 8 and 9 and is at its innermost end made with a curved resilient arm 17, which slides against a surface 18 on the lower guide 8. The arm 17 is somewhat pretensioned when the slide is in its mounted state, so that it presses the slide upwards to take up the play between, in the first place, the guide surface 14 of the slide and the guide surface 16 of the upper guide 9.

The slide 10 cooperates with a latch member 20, which is swingably mounted in the space between the plates 5 and 6. The latch member 20 consists of an L-shaped plate and has a latch portion 21 made for engagement with a suitable blocking means (not shown) in a cassette or the like in the dashboard. The latch member 20 has a portion 22 with a recess 23 in which a protrusion 24 on the slide 20 engages in the position shown with solid lines in the figure. The latch member 20 and the protrusion 24 are made of metal, and the protruding portion 24 has a T-shaped portion 25 fitted into a T-shaped groove in the slide 10. In the position shown in the figure, the latch member 20 is in its locked position and the slide 10 is locked against movement to the left. A folded leaf spring 26 and a spring tongue 27 assure freedom from play. The front plate 2 has a slot for each slide 10 and in the locked position, each slide is pushed in so far that its outer end is flush with the surface of the front plate. The latching portion 21 of the latch member 20 engages in this position with a fixed blocking means (not shown) in a theft preventive cassette permanently mounted in the dashboard. The above described arrangement provides a certain amount of resilience in the engagement of the latch means because the inner end of the slide, upon clockwise rotation of the latch 20, can be displaced somewhat against the effect of the spring force of the arm 17. This means that the latch in its locked position will be under a certain amount of spring tension due to the force of the spring arm 17, which assures freedom from play and eliminates all rattling, when the apparatus is to be removed, the slide 10 is pushed in only as far as is needed for the protrusion 24 to slide out of the recess 23. In practice, all that is required is to push the slide in several millimeters. Since the end of the slide is flush with the front plate 2, an aid such as a coin or the like is required to push in the slide. When the protrusion 24 slides out of the recess 23, the folded spring 26 can push the slide 10 outwards to the position shown with dash-out lines in the figure, at the same time as the slide swings in the latch so that it disengages the blocking means. The slide is provided at its outer end with a recess 28 forming a handle 29, which in this position projects outside of the front plate so that the apparatus can be easily removed.

When reinserting the apparatus, each slide 10 is only pushed in until the end lies flush with the front plate 2, and the protrusion 24 snaps into the recess 23. This can be done without any aids. The design according to the invention provides a simple and reliable mechanism with only two moving parts. The mechanism can be made very thin, in practice only a few millimeters thick.

I claim:

1. In a combined handle and lock mechanism for a dashboard mounted apparatus such as a car radio or the like, comprising a latch member which can be moved into and out of engagement with a cooperating blocking means fixed relative to the dashboard; the improvement comprising a slide guide (5–9) to be securely fastened to the apparatus (1), a slide (10) displaceably mounted in the slide guide and having a handle-shaped end portion (29), a latch member (20) displaceably mounted on the apparatus relative to the slide guide, and interacting portions (24, 23) of the slide and the latch member, respectively, which portions, in a predetermined inserted position of the slide into said guide, hold the latch member in a locked position and block the slide against being pushed out, said interacting portions permitting further insertion of the slide beyond said predetermined position to disengage the latch member and permit the slide to be pushed out past said predetermined position to an outer end position in which the handle protrudes outside the slide guide.

2. Mechanism according to claim 1, and spring means (17) against the spring force of which the movable latch member (20) is limitedly movable in its locked position, to provide a spring bias in the engagement between the movable latch member and the fixed blocking means.

3. Mechanism according to claim 1 wherein the slide guide (5–9) comprises a pair of plates (5, 6) joined to each other with a small space between them, said plates being fastenable to the apparatus with said slide (10) being displacable in said space, the latch member (20) being swingably mounted in the space and having a latching portion (21) which protrudes in said locking position, out of said space.

4. Mechanism according to claim 3, wherein the slide (10) is guided with a small transverse play in the slide guide and has a spring member (17) which slides against a guide surface (18) of said guide to take up the play.

5. Mechanism according to claim 4, wherein the slide (10) is spring loaded outwards and is made with a protrusion (24), which in the locked position of the latch member (20) extends into a recess (23) in the latch member and is held in this position under the influence of the outwardly directed spring force, and that said spring member (17) together with said play permits some resilient movement of the latch member in the locked position.

6. Mechanism according to claim 5, wherein the slide (10) is a thin plate of resilient material and the spring member (17) is in one piece with the plate.

7. Mechanism according to claim 1, and a fixed cover plate having an opening through which said handle protrudes in said outer end position, said handle being flush with the outer surface of said cover plate in said locked position and being spaced inwardly from said outer surface upon said further insertion of the slide.

8. Mechanism according to claim 7, said opening being a slot of a size and shape to receive a coin used as a tool to cause said further insertion of the slide.

* * * * *